United States Patent [19]

Yen

[11] Patent Number: 4,759,990
[45] Date of Patent: Jul. 26, 1988

[54] COMPOSITE OPTICAL ELEMENT INCLUDING ANTI-REFLECTIVE COATING

[76] Inventor: Yung-Tsai Yen, 1192 St. Anthony Ct., Los Altos, Calif. 94022

[21] Appl. No.: 802,707

[22] Filed: Nov. 27, 1985

[51] Int. Cl.$^4$ .......................... B32B 27/00; G02B 1/10
[52] U.S. Cl. .................................... 428/421; 428/509; 428/519; 428/216; 368/317; 264/310; 339/17 N; 339/17 T; 350/164
[58] Field of Search ................. 428/421, 509, 519; 368/317; 350/164

[56] References Cited

U.S. PATENT DOCUMENTS

| | | | |
|---|---|---|---|
| 2,628,923 | 2/1953 | Yaeger | 428/509 |
| 2,888,368 | 5/1959 | Grantham | 428/509 |
| 4,407,887 | 10/1983 | Hazhizume et al. | 428/421 X |
| 4,585,694 | 4/1986 | Dehennau | 428/421 X |

Primary Examiner—P. C. Ives
Attorney, Agent, or Firm—Kolisch, Hartwell & Dickinson

[57] ABSTRACT

A plural-layer, composite, high-transmissivity, optical element with a two-layer, organic, anti-reflective coating. The element includes a base layer, an intermediate layer formed of an organic material which is joined to and distributed over a face in the base layer, and a third layer formed of another organic material which is joined to and distributed over the exposed face in the intermediate layer. The intermediate and third layers cooperatively form the anti-reflective coating. All layers are prepared by spin casting. The solvent used in preparing the intermediate layer is chosen to be one which will not dissolve the base layer, and the solvent used in preparing the third layer is chosen to be one which will not dissolve either the intermediate layer or the base layer.

8 Claims, 1 Drawing Sheet

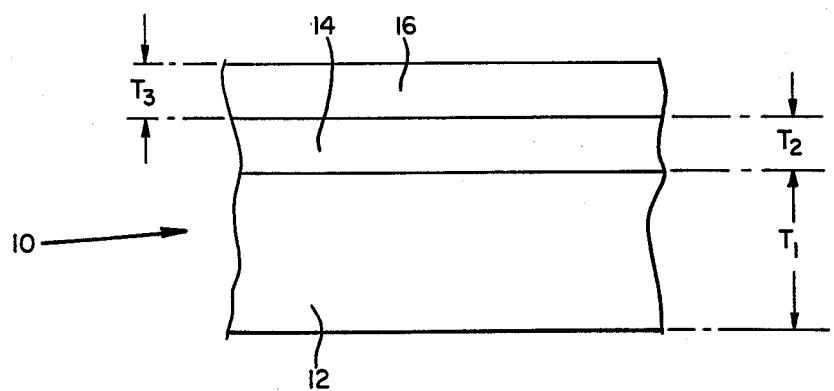

COMPOSITE OPTICAL ELEMENT INCLUDING ANTI-REFLECTIVE COATING

BACKGROUND AND SUMMARY OF THE INVENTION

This invention relates to an optical element, such as a membrane or pellicle, and more particularly to a plural-layer, composite, high-transmissivity element with a two-layer, organic, anti-reflective coating.

In recent years, various optical elements, such as pellicles, have played an important role in the making of semiconductor wafers that are used in various integrated semiconductor circuits. As is well understood by those skilled in the art, pellicles protect (against contamination) photo masks which are used in the various photolithography steps required in wafer preparation.

The typical pellicle takes the form of an extremely thin optical film which is supported on a ring-like frame, the entirety which is then placed over a wafer during photolithography. In order to be most effective, a pellicle, in addition to preventing contamination of a photo mask, should also exhibit a very high degree of optical transmissivity at the wavelength of light which is used during photolithography.

While single-layer pellicles, typically made of nitrocellulose, have been widely and successfully used in the past, there are many instances in which the user desires an even higher degree of transmissivity than is obtainable with such a pellicle. To this end, the preparation of plural-layer pellicles where so-called anti-reflective coatings are added have been proposed. Such coatings, in the past, in the field of pellicles, have taken the form of multiple layers of inorganic material suitably deposited, one after another, on one face, or on both faces, of a base nitrocellulose layer. Such coatings, however, have presented several problems.

To begin with, materials chosen in the past to prepare anti-reflective coatings have required vacuum deposition at extremely high temperatures, such as above 1,000-degrees Centigrade, and thus have dictated a relatively slow and expensive batch-processing manufacturing approach. Another important concern is that a significant thermal mismatch exists between the usual base nitrocellulose layer and such anti-reflective coating layers which can result in cracking and/or subsequent peeling of the anti-reflective coating.

A general object of the present invention, therefore, is to provide a unique optical element construction including an anti-reflective coating which avoids the difficulties just mentioned.

According to a preferred embodiment of the invention, the proposed element (usable as a pellicle) includes a base layer, formed typically of nitrocellulose or cellulose acetate, an intermediate layer formed of an organic material which is joined to and distributed over a face in the base layer, and another layer formed of another organic material joined to and distributed over the exposed face in the intermediate layer. The intermediate layer proposed in the construction of the invention takes the form of a aromatic polymer compound, or a vinyl-group-containing compound. Well suited for this layer are polyvinylnaphthalene, polymethylstyrene, and polystyrene, prepared for distribution over the nitrocellulose or cellulose acetate layer in a solvent of toluene or xylene. The third-mentioned layer takes the form of a fluorocarbon compound, the composition of which, in a preferred form, prepared in a suitable solvent, will be described below.

The various objects and advantages which are attained by the invention will become more fully apparent as the description which now follows is read in conjunction with the single drawing figure.

DESCRIPTION OF THE DRAWING

The figure is a simplified, fragmentary elevation illustrating a plural-layer, composite, high-transmissivity, optical element constructed in accordance with the present invention.

DETAILED DESCRIPTION OF THE INVENTION

Referring to the figure, indicated generally at 10 is an optical element membrane (pellicle) constructed in accordance with the present invention. Included in element 10 are a base layer 12, an intermediate layer 14, and a third, or other, layer 16. These layers are prepared, one after another, by a conventional technique, such as spin casting. In particular, they are prepared and cured easily at room temperature or below 100-degrees Centigrade.

Layer 12 has a thickness $T_1$ of about 2.8-microns, and is formed preferably of nitrocellulose, which is conventionally used in pellicles. Another material, as mentioned, which may be used for this layer is cellulose acetate. Layer 12 has a refractive index of about 1.5. Layer 14 is formed preferably of an organic aromatic vinyl-group-containing polymer compound, such as polyvinylnaphthalene, polymethylstyrene, or polystyrene. In membrane 10, layer 14 is formed specifically of polyvinylnaphthalene prepared in the solvent of toluene, with a thickness $T_2$ of about 650-Angstroms. Layer 14 has a refractive index of about 1.7. Finally, layer 16 is formed of a fluorocarbon compound with a thickness $T_3$ of about 800-Angstroms. Layer 14 has a refractive index of about 1.4.

The material for layer 16 was prepared as is now described. 1000-ml of a product made by the Minnesota Mining and Manufacturing Company (3M), known as FC-721 was concentrated to 200-ml by low-pressure evaporation. 1800-ml of a solvent containing, by volume, 100% of another 3M product known as FC-77, was added to the concentrate. After filtration, the resulting 2000-ml mixture was ready for spin casting, as indicated earlier, onto layer 14.

With spin casting used as the technique for preparing all of the layers in the membrane, good thickness control results.

An extremely important consideration to note is that it is critical that the solvent used for the intermediate layer not dissolve the base layer, and that the solvent used for the outer layer not dissolve either the intermediate layer or the base layer. The solvents described above amply meet this requirement.

Layers 14, 16 cooperate to produce what is referred to herein as an anti-reflective V-coating, the physics of which is well known by those skilled in the art. With these layers formed of organic materials like those mentioned, the problems referred to above are substantially completely avoided. More specifically, these layers exhibit a close thermal match with the base nitrocellulose layer, and as a consequence, cracking and peeling are avoided. Further, because layers 14, 16 can be formed and cured substantially at room temperature, with a typical curing/drying time of 5 to 10-minutes, this leads to a far more efficient and less costly manufacturing procedure. Simple, continuous (as distinguished from batch) processing is possible.

The element described herein includes an anti-reflective coating on one side only of the base layer. Those skilled in the art will recognize, however, that there may be instances where it is desirable to create such a two-layer coating on both sides of the base layer. Also, it should be recognized that optical elements, other than membranes and pellicles, may be constructed in accordance with the teachings of the invention.

Thus, while a preferred embodiment of the invention has been disclosed and described herein, and a modification suggested, it is appreciated that other variations and modifications may be made without departing from the spirit of the invention.

It is claimed and desired to secure by Letters Patent:

1. A plural-layer, composite, high-transmissivity, optical pellicle having predetermined, precise thickness and including an anti-reflective coating, for use as a contamination-reducing cover in photo lithography operations, comprising:
    a base layer formed of a cellulose-based compound;
    an intermediate layer formed of an organic material selected from the group consisting of polyvinyl-naphthalene, polymethylstyrene and polystyrene, said intermediate layer being joined to and distrubuted over a face in said base layer; and
    another layer formed of a fluorocarbon compound joined to and distributed over the exposed face in said intermediate layer,
    said intermediate and other layer cooperatively forming said anti-reflective coating.

2. The pellicle of claim 1 wherein said intermediate layer is prepared in an aromatic solvent.

3. The pellicle of claim 2 wherein the aromatic solvent is toluene.

4. The pellicle of claim 2 wherein the aromatic solvent is xylene.

5. The pellicle of claim 1 wherein said second and third layers are formed by spin casting.

6. The pellicle of claim 1 wherein said fluorocarbon compound is prepared in a fluorinated solvent.

7. The pellicle of claim 1 wherein the material for the base layer is selected from the group consisting of nitrocellulose and cellulose acetate.

8. The pellicle of claim 1 wherein said layers are formed by sequential spin casting.

* * * * *